Nov. 29, 1966 A. C. MASON ET AL 3,287,975
TEMPERATURE INDICATOR
Filed April 12, 1963
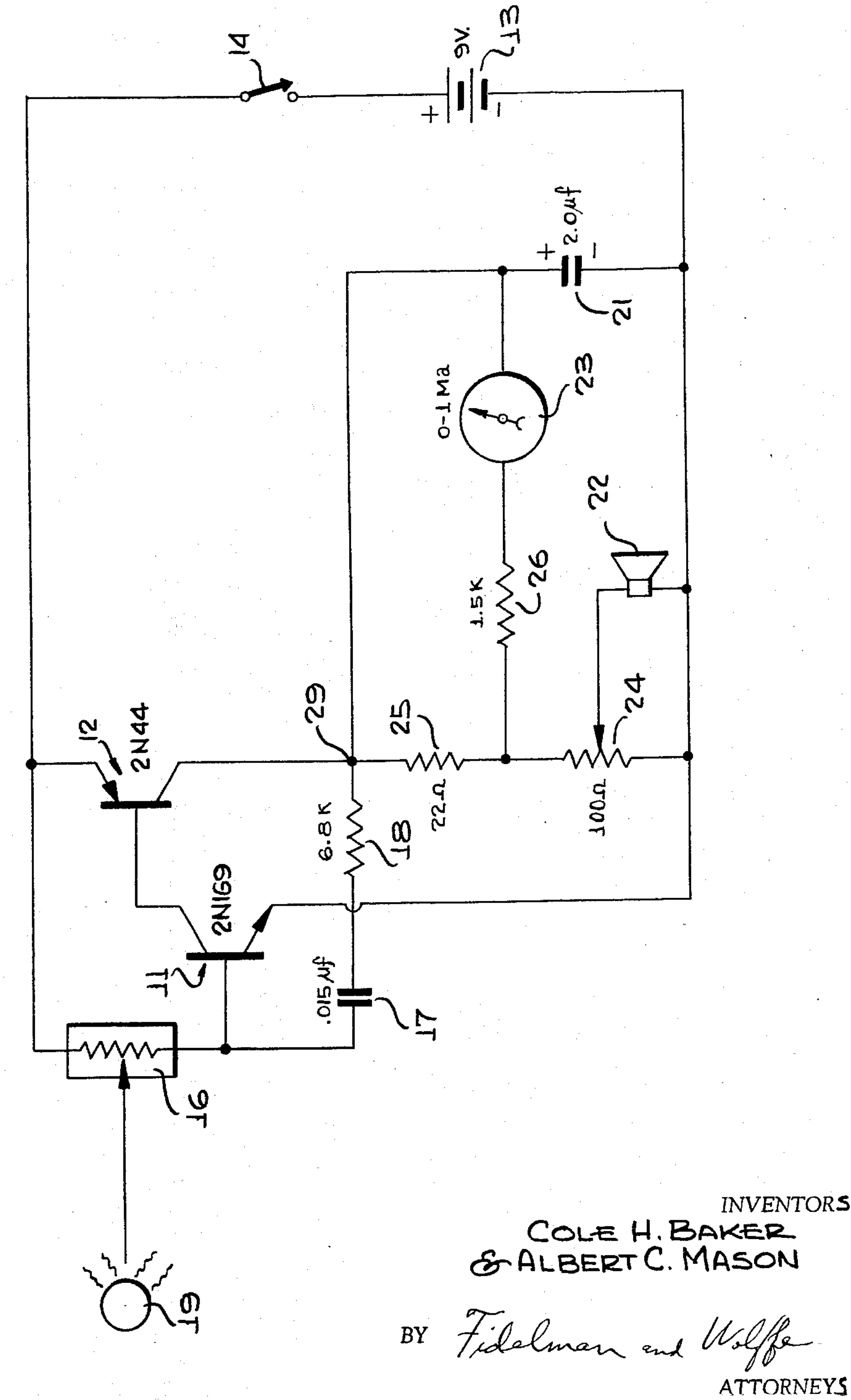
INVENTORS
COLE H. BAKER
& ALBERT C. MASON
BY Fidelman and Wolffe
ATTORNEYS United States Patent Office 3,287,975

Patented Nov. 29, 1966

3,287,975
TEMPERATURE INDICATOR

Albert C. Mason, Larchmont, N.Y., and Cole H. Baker, Riverside, Conn., assignors to Pyrotel Corp., Mamaroneck, N.Y., a corporation of New York Filed Apr. 12, 1963, Ser. No. 272,601
7 Claims. (Cl. 73—355)

The present invention relates generally to temperature indicating instruments and more particularly to a temperature indicator wherein the frequency of a relaxation oscillator is varied as a function of the impedance of an infrared detector.

The utilization of sinusoidal oscillators which derive variable frequency aural signals dependent upon the impedance of a temperature responsive element has been known for a number of years. These oscillators are frequently characterized by relatively complex modulator and demodulator circuits, hence are overly expensive, bulky, and difficult to handle when gross temperature measurements, such as employed with aural signalling, are desired.

The present invention provides a portable, easily handled, and very inexpensive audio frequency oscillator of the relaxation type, having its frequency varied in response to the amount of energy impinging on an infrared detector. The detector is connected in a resistance, capacitance charging circuit, of a transistorized relaxation oscillator. The oscillator is of the type wherein both of its transistors, which are of opposite conductivity type, simultaneously conduct current between their emitters and collectors and only a single RC timing circuit is included.

The detector is connected in the timing circuit between the base of a first transistor and emitter of the other transistor while the timing capacitor is connected in series with a fixed resistor between the base and the collector of the first and other transistors, respectively. This circuit arrangement is highly desirable because the detector impedance variations have two separate, but similar effects on the oscillating frequency of the circuit. As the resistive value of the detector varies, the charging rate for the timing capacitor is changed to control the oscillating frequency. Also, the resistive value of the detector determines the maximum voltage of the trailing edge of the sawtooth wave coupled to the base of the first transistor. This voltage determines how far below cut off the base of the first transistor drops, hence controls the time it takes for the base to reach saturation when the trailing edge once again commences. By connecting the detector as described, the maximum voltage of the trailing edge cooperates with the time constant of the charging circuit to control the oscillating frequency.

To derive visual and aural signals indicative of the frequency of oscillation, an output circuit including a capacitor and a resistive discharge circuit therefor is connected between the collector of the second transistor and the power source. The capacitor is charged by the source each time the second transistor is rendered conductive. When the second transistor is cut off in response to the trailing edge of the sawtooth oscillations, the charge of the output capacitor leaks off through the discharge circuit. By connecting a voltmeter and a speaker across resistances in the discharge circuit, there are derived visual and varying pitch aural indications of the oscillation frequency, hence of the temperature being monitored.

It is accordingly an object of the present invention to provide a new and improved temperature indicating circuit.

Another object of the present invention is to provide a relaxation oscillator having its frequency varied as a function of the tempertaure of a source being measured.

A further object is to provide a new and improved pyrometer wherein visual and variable pitch aural signals are derived indicative of the temperature being measured.

An additional object is to provide a new and improved variable frequency relaxation oscillator.

Yet another object is to provide a new and improved pyrometer which is simple, portable, inexpensive, and provides easily detected indications, yet is highly reliable.

The above and still further objects, features and advantages of the present invention will become apparent upon consideration of the following detailed description of one specific embodiment thereof, especially when taken in conjunction with the accompanying drawing, wherein the single figure is a circuit diagram of a preferred embodiment of the present invention.

Reference is now made to the figure wherein NPN and PNP transistors 11 and 12 have their emitter-collector paths energized by D.C. supply 13 via manually operated off-on switch 14. Collector current for transistor 11 is coupled through its load, the base emitter junction of transistor 12, so that conduction through the collector of transistor 11 causes conduction between the emitter and collector of transistor 12.

Connected in shunt with the emitter and collector of transistor 12 is a timing circuit comprising the series combination of infrared detector 16, capacitor 17, and resistor 18. Detector 16, coupled between the emitter of transistor 12 and the base of transistor 11, is a variable resistance the value of which is controlled in response to the amount of infrared energy impinging thereon from heat source 19. Hence, the charging rate of capacitor 17 is a function of the temperature of source 19 as is the frequency of the audio frequency, sawtooth oscillations established in the circuit.

Between the collector of transistor 12 and the negative terminal of supply 13 are a large filtering capacitor 21, and a pair of output devices comprising speaker 22 and D.C. milliameter 23. To provide an adjustment of the aural signal having a pitch dependent upon the temperature of source 19, speaker 22 is shunted across the slider and one end of potentiometer 24. This end of potentiometer 24 is connected to the junction formed by the negative terminal of source 13 with the emitter of transistor 11. The other end of potentiometer 24 is connected at junction 29 to the collector of transistor 12 via current limiting resistor 25 so that resistances 24 and 25 as well as capacitor 21 are the collector load for the pulsating currents coupled though transistor 12.

To provide an approximate visual indication of the oscillating frequency established in the circuit, hence the temperature of source 19, meter 23 and the relatively large resistance 26 are connected in series across resistor 25, so that the meter provides an indication of the D.C. voltage across resistance 25, an approximate indication of the oscillating frequency.

In operation, with switch 14 closed, charging current is supplied from source 13 to capacitor 17 via resistive detector 16 and resistances 18, 24 and 25. This operation continues until the base-emitter junction of transistor 11 is sufficiently forward biased by the charge accumulated across capacitor 17 to be saturated. When this occurs, capacitor 17 discharges through the base-emitter path of transistor 11. In consequence, appreciable current is drawn from the base of transistor 12, which becomes forward biased to saturation and the potential at the collector of transistor 12 rises. The potential difference across the timing circuit comprising resistors 16 and 18 as well as capacitor 17 is now reduced, causing discharge of capacitor 17 through transistor 12. Discharge continues until the voltage at the base of transistor 11 has decreased sufficiently to cause the transistor to cut off. When this occurs, base current for transistor 12 ceases to flow and the transistor stops conducting so that the voltage at junction 29 suddenly decreases. The decreased voltage at junction 29 is attenuated by resistance 18, coupled through capacitor 17 to the base of transistor 11, and drives that transistor further into cut-off. The degree of attenuation introduced by resistor 18, hence the extent which the base of transistor 11 is driven beyond cut-off, depends upon its value relative to the resistive value of detector 16.

After the negative going wavefront coupled to the base of transistor 11 reaches its maximum excursion, capacitor 17 is recharged by source 13 through detector 16, and resistances 18, 24, and 25. Recharging continues until the base emitter junction of transistor 11 is sufficiently forward biased to render transistor 12 conductive, at which time the previously described cycle reoccurs.

It is thus seen that the resistive value of detector 16 influences the period of the charge cycle in two distinct manners having a cumulative effect on the frequency of oscillation. The charge cycle is controlled by the impedance of detector 16 because it has a direct bearing on the RC time constant of the charging circuit. For large impedance values of detector 16, the period of the timing cycle of course is increased. The charge cycle is effected in a further manner because the impedance of detector 16 determines the percentage of the voltage drop at terminal 29 which is coupled to the base of transistor 11. When source 19 is of low temperature and the impedance of detector 16 is large, the base voltage of transistor 11 is driven considerably lower than for low impedances of detector 16. Hence, the recharging cycle starts at low potentials for large impedance values of detector 16. This contributes to long time durations between the initial charging and discharging portions of each cycle because of the large potential difference between the initial charging voltage and the base saturation voltage of transistor 11. For low impedance values of detector 16, the difference between these two voltages is small so that transistors 11 and 12 are quickly driven into their conducting states after cut-off. It should now be apparent that the effects of impedance 16 on the periodicity of the circuit are additive in the same direction. If detector 16 and resistor 18 were interchanged, the two described effects would be in an opposite direction with a tendency to compensate each other so that frequency variations would not be as pronounced as in the present circuit.

Returning again to the circuit operation, each time transistor 12 is forward biased to its highly conductive state, source 13 applies a charging current to capacitor 21. When transistor 12 is driven to cut-off, condenser 21 discharges at a slow rate through resistances 24 and 25. The discharge rate for capacitor 21 is less than that of the circuit comprising capacitor 17 for the highest impedance value of detector 16. Thereby, a substantially sawtooth current is always being supplied through resistor 24, so that a continuous audio signal is derived from speaker 22. The frequency of the sawtooth current is determined by the timing circuit comprising capacitor 17 in such a manner that the temperature of source 19 is reflected in the pitch of the audio signal derived from speaker 22.

Since the impedance of speaker 22 is much less than that of potentiometer 24, adjustment of potentiometer 24 functions to control both level and frequency of the derived sounds. Varying the frequency of the oscillations as a function of volume does not adversely affect the accuracy of the device because a predetermined setting is made at the time each individual measurement is made. The human ear generally responds to changes in pitch to determine the temperature of source 19, rather than to absolute frequencies.

The visual indication provided by meter 23 is provided by measuring the average voltage across resistor 25. The D.C. voltage across resistance 25 varies approximately as a function of circuit frequency because the extent of discharge from capacitor 21 is dependent on the period between successive applications of current thereto by source 13. Hence, if capacitor 21 is allowed to discharge considerably, the current it supplies to resistor 25 decays to a low value just prior to forward biasing of transistor 12 and the average voltage across resistor 22 is quite low. If, however, transistor 12 is frequently biased into conduction, capacitor 21 never greatly discharges so the minimum value of the sawtooth current through and voltage across resistor 25 remains relatively large. Thereby, the D.C. or average voltage across resistor 22 is fairly large and the reading of meter 23 provides an indication of the temperature of source 19.

While we have described and illustrated one specific embodiment of our invention, it will be clear that variations of the details of construction which are specifically illustrated and described may be resorted to without departing from the true spirit and scope of the invention as defined in the appended claims.

We claim:

1. A system for indicating the temperature of a body comprising a variable audio frequency relaxation oscillator adapted to be energized by a D.C. source, said oscillator including: a first transistor, a second transistor of opposite conductivity type to said first transistor, separate loads for the emitter collector paths of said transistors, means for connecting the emitter collector paths of said transistors across the terminals of said source, means for coupling signals at the collector of each transistor to the base of the other transistor, said last named means including a resistance capacitance timing circuit having connections to the base and collector of said first and second transistors, respectively, said timing circuit including a variable resistive element having its impedance varied in response to the amount of infrared energy impinging thereon from said body, whereby the frequency of the waves generated by said oscillator is varied in response to the impedance of said element; means responsive to said waves for deriving an aural signal, said means for deriving an aural signal comprising: resistor means connected in said load circuit, a capacitor connected across said resistor means; and a speaker having its coil responsive to the current through said resistor means; and means for providing a visual indication of the average current flow through said resistor means.

2. The system of claim 1 wherein said visual indication providing means comprises a D.C. ammeter, said ammeter being connected between said capacitor and a tap on said resistor means.

3. A system for indicating the temperature of a body comprising a variable frequency relaxation oscillator adapted to be powered by a source of D.C. potential, said oscillator including; a pair of opposite conductivity type transistors having their emitter collector paths connected to be energized by said source, the emitters of said transistors being D.C. coupled to opposite terminals of said source and the collector of one of said transistors being coupled to the base of the other transistor, a D.C. load impedance series connected between said source and the emitter-collector path of said other transistor, a timing circuit including variable resistance means responsive to infrared energy impinging thereon from said body, said timing circuit being connected in shunt with the collector emitter path of said other transistor and having a tap connected to the base of said one transistor, said variable resistance means being connected across the base of said one transistor and the emitter of the other transistor, said timing circuit further including a resistor and a capacitance series connected between said tap and the collector of said second transistor, said variable resistance means, said resistor, said capacitance and said load impedance being the only current path between the terminals of said source and the base electrode of said transistor, whereby variable, audio frequency oscillations are generated by said oscillator; and means responsive to the audio frequency current flow through said load for deriving an aural signal, wherein said means for deriving an aural signal comprises resistor means connected in said load circuit, a capacitor connected across said resistor means, a speaker having its coil responsive to the current through said resistor means, and means for providing a visual indication of the average current flow through said resistor means.

4. A system for indicating the temperature of a body comprising a variable frequency relaxation oscillator adapted to be powered by a source of D.C. potential, said oscillator including; a pair of opposite conductivity type transistors having their emitter collector paths connected to be energized by said source, the emitters of said transistors being D.C. coupled to opposite terminals of said source, the collector of one of said transistors being coupled to the base of the other transistor, a D.C. load impedance connected to provide a D.C. path between said source and the emitter-collector path of said other transistor, said load impedance including a shunt capacitor, a resistance capacitance timing circuit including variable resistance means responsive to infrared energy impinging thereon from said body, said timing circuit being connected in shunt with the collector emitter path of said other transistor and having a tap connected to the base of said one transistor, said variable resistance means being connected across the base of said one transistor and the emitter of the other transistor, said timing circuit further including a resistor and a capacitance series connected between said tap and the collector of said other transistor, the impedances in said load circuit relative to the value of the maximum impedance of said timing circuit being such that the discharge rate for the capacitor is less than the discharge rate of the capacitance of said timing circuit, whereby continuous audio frequency oscillations of frequency dependent on the value of said resistance means are generated by said oscillator; and means responsive to the audio frequency current flow through said load for deriving an aural signal.

5. The system of claim 4 wherein said means for deriving an aural signal comprises resistor means connected in said load circuit, a capacitor connected across said resistor means, a speaker having its coil responsive to the current through said resistor means, and means for providing a visual indication of the average current flow through said resistor means.

6. A system for indicating the temperature of a body comprising a variable frequency relaxation oscillator adapted to be powered by a source of D.C. potential, said oscillator including; a pair of opposite conductivity type transistors having their emitter collector paths connected to be energized by said source, the emitters of said transistors being D.C. coupled to opposite terminals of said source, the collector of one of said transistors being coupled to the base of the other transistor, a D.C. load impedance connected to provide a D.C. path between said source and the emitter-collector path of said other transistor, said load impedance including a shunt capacitor, a resistance capacitance timing circuit including variable resistance means responsive to infrared energy impinging thereon from said body, said timing circuit being connected in shunt with the collector emitter path of said other transistor and having a tap connected to the base of said one transistor, said variable resistance means being connected across the base of said one transistor and the emitter of the other transistor, said timing circuit further including a resistor and a capacitance series connected between said tap and the collector of said other transistor, whereby audio frequency oscillations of frequency dependent on the value of said resistance means are generated by said oscillator; and means responsive to the audio frequency current flow through said load for deriving an aural signal, said means for deriving an aural signal comprising: resistor means connected in said load circuit, a capacitor connected across said resistor means, a speaker having its coil responsive to the current through said resistor means, and means for providing a visual indication of the average current flow through said resistor means.

7. The system of claim 6 wherein said visual indication providing means comprises a D.C. ammeter, said ammeter being connected between said capacitor and a tap on said resistor means.

References Cited by the Examiner

UNITED STATES PATENTS

| | | | |
|---|---|---|---|
| 2,747,095 | 5/1956 | Bouke | 331—64 X |
| 2,937,281 | 5/1960 | Bosch | 250—83 |
| 2,986,709 | 5/1961 | Myers | 331—111 X |
| 3,029,642 | 4/1962 | Burhans et al. | 331—66 X |
| 3,046,494 | 7/1962 | Root | 331—111 |

LOUIS R. PRINCE, *Primary Examiner.*

DAVID SCHONBERG, *Examiner.*

S. H. BAZERMAN, *Assistant Examiner.*